United States Patent Office 3,393,149
Patented July 16, 1968

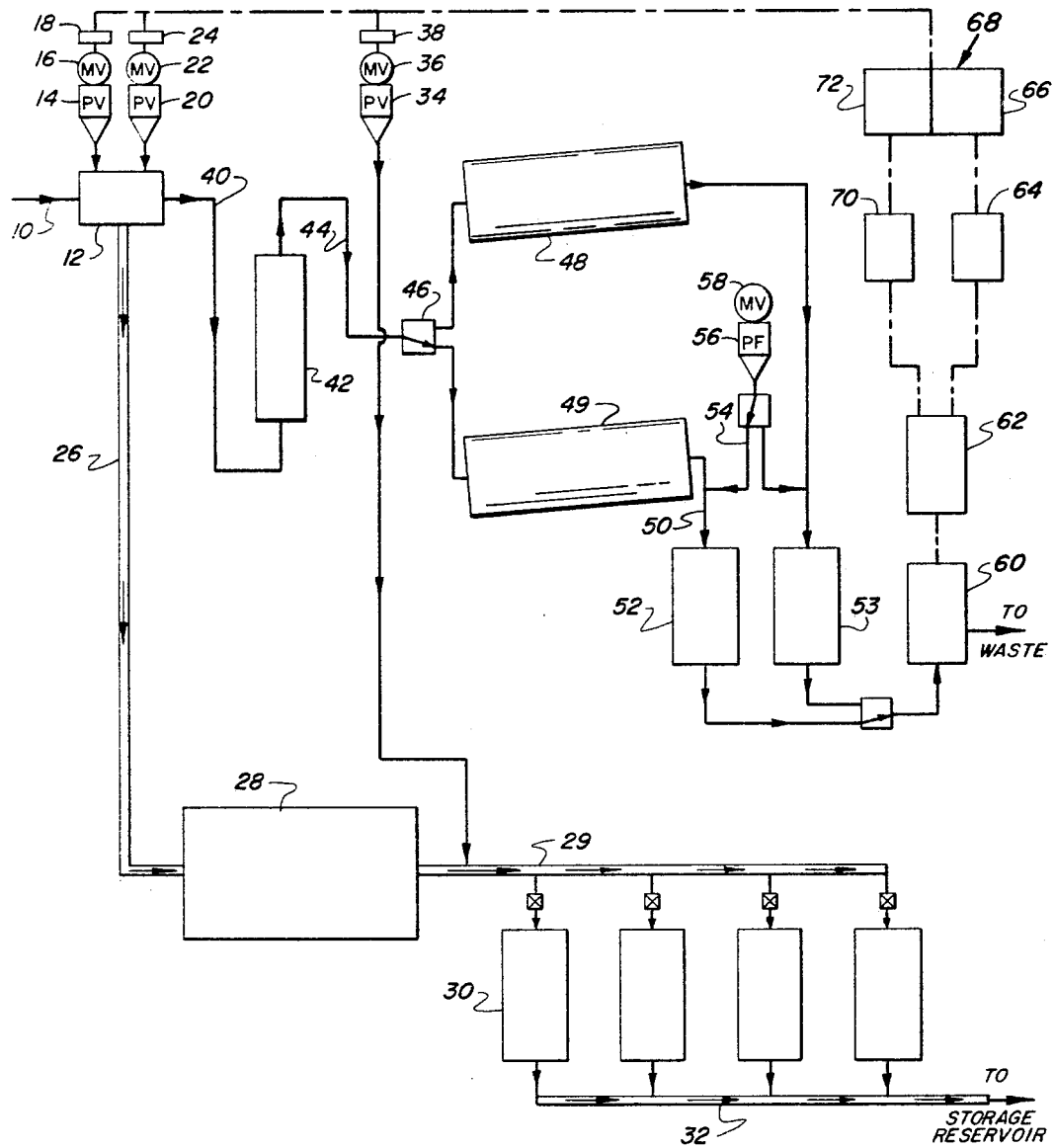

3,393,149
DOSAGE CONTROL SYSTEM AND METHOD FOR THE TREATMENT OF WATER OR SEWAGE
Walter R. Conley, Richard H. Evers, and William F. Ettlich, Corvallis, Oreg., assignors to General Services Company, Corvallis, Oreg., a corporation of Oregon
Filed Dec. 14, 1965, Ser. No. 513,740
10 Claims. (Cl. 210—42)

The present invention relates generally to the treatment of water and sewage and more particularly to an improved process and system for controlling automatically the dosages of clarifying chemicals added to an influent to be treated in response to variations in effluent turbidity so as to produce a treated effluent having a predetermined acceptable clarity.

The present invention is a distinct improvement over the automatic dosage control system which is the subject of United States Patent No. 3,067,133. In both the above-patented system and the system of the present invention, means are provided for increasing automatically the feed rate of coagulant into the water to be treated upon an increase in the turbidity of a sample effluent from a pilot filter, since high effluent turbidity is usually caused by an inadequate coagulant dosage. However, this is not always the case. High effluent turbidity can also be caused by the presence of too much coagulant in the water to react with the available alkalinity. This condition is likely to occur either in treating raw waters of naturally very low alkalinity or in treating highly turbid, muddy raw waters which become low in alkalinity after large amounts of acid-producing coagulants have been added thereto to clarify the same. Increasing the coagulant dosage with the above-patented system upon a rise in effluent turbidity caused by either of the above two water conditions would only further increase the effluent turbidity inasmuch as such system is incapable of distinguishing between different causes of high effluent turbidity. For the foregoing reasons, the above-patented system operates satisfactorily only in treating rarely occuring raw waters of consistently low turbidity and of an alkalinity sufficient to promite optimum coagulation.

Accordingly, the primary object of the present invention is to provide a new and improved automatic dosage control process and system having a much broader application than prior such systems in that the new system is suitable for use in treating most raw water and sewage influents, including influents of both high and low alkalinity and high and low turbidity.

A more specific object is to provide a dosage control process and system which adjust the coagulant dosage in an influent being treated in response to variations in the turbidity of a control effluent and which remove as a factor causing high turbidity of the control effluent an excess of coagulant in the influent.

Another specific object is to provide a dosage control process and system which eliminate low alkalinity of the influent as a cause of high turbidity of the control effluent.

Still another specific object is to provide a dosage control system which minimizes the possibility of filter breakthrough being a cause of high control effluent turbidity.

Another object is to provide an automatic dosage control system including means for increasing the alkalinity of a raw water control sample of low alkalinity to a level sufficient to promote optimum coagulation and thereby remove any excess coagulant from such sample.

A further specific object is to provide a dosage control system including a novel settling tube enabling the automatic treatment of raw waters of exceptionally high turbidity.

Another object is to provide an automatic dosage control system suitable for determining the dosages of other treatment chemicals in addition to coagulant dosages.

Still another object is to provide a dosage control system as aforesaid including automatic control means for increasing or decreasing the required dosage in steps as required and with a predetermined time lag to eliminate sporadic dosage changes in response to only momentary fluctuations in turbidity.

Our invention resides in the discovery that most raw waters, including waters of exceptionally high turbidity and/or low alkalinity, can be treated automatically with the proper dosages of coagulant and other treatment chemicals by increasing or decreasing such dosages in response to a rise or fall, respectively, in turbidity of effluent from a control filter after first removing all factors that might cause a high effluent turbidity other than a deficiency of coagulant in the water being treated. More specifically, we have found that by first adjusting the alkalinity of a sample of coagulant-treated raw water to at least a minimum level for optimum floc formation and then settling out most of the floc from the sample before passing the sample through a control filter, changes in turbidity of the filter effluent will correspond accurately with the need for a change in the coagulant dosage in the main body of water being treated.

The above and other objects and advantages of the dosage control system of the present invention will become more apparent from the following detailed description and the accompanying drawing in which the single figure is a diagram of a water treatment plant incorporating a pilot dosage control system in accordance with the present invention.

Process

Automatic control of coagulant feed in accordance with our process is as follows:

(1) The main body of turbid raw water is treated with an inorganic coagulant.

(2) A sample stream of the coagulant-treated raw water is drawn from the main body through a pilot line and then passed upwardly through a fluidized bed of calcite ($CaCO_3$), or some other pH-adjusting means, to raise the pH of the pilot stream, providing it has an initially low pH, into a range to produce optimum coagulation and thereby assure that the coagulant will subsequently be removed in the settling and filtering devices provided.

(3) If the raw water is likely at times to have a turbidity exceeding about 750 p.p.m., the pH-adjusted pilot flow is passed through a settling tube where most of the floc formed by the coagulant is removed.

(4) The sample stream, under greatly reduced load, is then passed through a multimedia control filter of decreasing effective particle size in the downstream direction where the remaining coagulated material is removed.

(5) The filter effluent is passed through a turbidimeter highly sensitive to changes in turbidity.

(6) A turbidity controller scans the effluent turbidity and produces a variable electric signal responsive to changes in turbidity. When effluent turbidity rises above or falls below a predetermined control range, the signal is caused to change the speed of a coagulant feed pump and vary the coagulant feed rate accordingly, increasing the dosage upon an increase in effluent turbidity and decreasing the dosage upon a decrease in effluent turbidity.

(7) Other treatment chemicals added to the main plant system are fed at rates which are a fixed proportion of the coagulant feed rate and which vary with a variation in the coagulant dosage.

Example A

The figure of the drawing is a simplified process diagram of a water treatment plant incorporating a pilot dosage control system in accordance with the invention for use in treating river water at Mill City, Oreg. The treatment facility includes a raw water intake line 10 through which raw river water is pumped into a contact basin 12. Alum is fed into the contact basin near its inlet end by an alum feed pump 14 driven by a variable speed D.C. electric motor 16, the speed of which is governed by a speed control unit 18. Soda ash is fed into the same basin by a pump 20 driven by another variable speed D.C. electric motor 22, the speed of which is also governed by a speed control unit 24 to adjust the alkalinity of the main plant flow if required.

Coagulant-treated water is pumped from the contact basin through a main plant line 26 to a conventional settling basin 28 where the majority of the coagulated material in the main flow is removed. From the settling basin the main plant flow passes through a line 29 which feeds a series of plant filters 30 which remove the remaining coagulated material. Such filters are of the multimedia type described in application Ser. No. 345,204, filed Feb. 17, 1964 now U.S. Patent No. 3,343,680.

Secondary flocculant is added to the main plant flow after it leaves the settling basin and just prior to its entry into the plant filters 30. This secondary flocculant is fed by a pump 34 driven by a variable speed D.C. electric motor 36, the speed of which is controlled by a speed control unit 38.

From the filters the plant flow passes through a line 32 leading to a storage reservoir (not shown). It might take several hours for water to pass from the contact basin through the main plant, settling basin and filters to the storage reservoir.

As the main plant flow is treated in the foregoing manner, a small sample of coagulant-treated water is drawn from the contact basin 12 into a pilot line 40 and then passed upwardly through a calcite column 42 to raise the pH of the coagulant-treated water to a range of between about 6 and 7, if it is not already in that range. From the calcite column the pilot flow passes through a line 44 and a valve 46 which directs the pilot flow to one of two generally horizontally disposed settling tubes 48, 49. Each settling tube has a three and one-half inch diameter and a length of approximately three feet, with each tube being sloped upwardly in the downstream direction approximately one-half inch in its full length. The flow rate through the settling tube is slightly less than one-half gallon per minute to give a minimum detention time of about three to four minutes so as to permit settling out of a maximum amount of floc.

From the settling tube 49 the pilot stream passes through a line 50 into one of two multimedia pilot filters 52, 53. Just before the flow reaches the pilot filters, a secondary flocculant is fed at a constant but adjustable rate into the flow through line 54 from a pump 56 driven by a variable speed D.C. electric motor 58.

Each filter bed has initially the following makeup, proceeding in the direction of flow:

| Depth | U.S. Sieve Size | Type of Media |
|---|---|---|
| 18 inches | −10 +20 | Anthracite coal. |
| 6 inches | −20 +40 | Graphitic sand. |
| 3 inches | −40 +100 | Garnet. |
| 3 inches | No. 16 | Garnet base. |

The material above the garnet base is backwashed to equilibrium to intermix the various layers, although this maintains an effective particle size which decreases in the downward direction through the filter.

The garnet base is supported on a multimetal screen. The pilot flow is filtered through this bed at a rate of about three gallons per minute per square foot.

From the pilot filters 52, 53 the pilot flow enters a light-scattering turbidimeter 60 sensitive to a 0.01 p.p.m. change in effluent turbidity.

A turbidity controller 62 includes a means for scanning the effluent turbidity and converting the turbidity reading to a corresponding electrical signal. The controller also includes means responsive to such signals for operating selectively a pair of adjustable contacts, one of which closes on a rising turbidity reading and the other of which closes on a falling turbidity reading. The contacts are set to close at the upper and lower limits of the plant effluent turbidity desired so that the plant turbidity will "float" between the two limits. When the controller senses a turbidity greater than the upper control limit, the upper contact closes to energize a time delay relay 64. When time delay 64 times out, it energizes a dosage control step-up coil 66 of a stepping switch 68 to increase the step switch one position, which in turn changes the output resistance to the three speed control units 18, 24 and 38 of the electric motors driving the chemical feed pumps 14, 20 and 34 to increase the speeds of such motors and thereby increase the coagulant, soda ash and secondary flocculant feed rates a predetermined increment.

If a turbidity reading below the lower control limit is sensed, another time delay 70 is energized which, when timed out, operates a step-down coil 72 of stepping switch 68 to move the step switch down one position. This in turn varies the output resistance to slow the speed of the chemical feed motors and thereby reduce the coagulant and other chemical dosages accordingly.

Each step of the stepping switch represents a predetermined coagulant feed rate. For example, step one might represent a 10 p.p.m. feed rate, step two a 20 p.p.m. rate, etc. If the scanning device senses more than the preset upper limit of turbidity, it would advance the switch one step, thereby increasing the alum feed 10 p.p.m. If after another time lag the controller still sensed an effluent turbidity above the control range, then another advance of the switch would be made to increase the dosage another 10 p.p.m. This would continue until the effluent turbidity returned to a value within the control range.

If on the other hand effluent turbidity falls below the control range for the predetermined time interval, the stepping switch would retreat one position to reduce the coagulant dosage by 10 p.p.m.

The time delay, or lag, between an abnormal effluent sensing and a coagulant dosage change is adjustable from 0 to 150 minutes so that if, in the interim, the effluent turbidity returns to normal, the previously energized time delay will be de-energized and no dosage correction will occur. This feature prevents a dosage change for every momentary variation in effluent turbidity outside the normal control range.

*Chemical feed*

The present control system is intended for use in conjunction with water treatment facilities using inorganic coagulants because such coagulants are most commonly used in water treatment and also because organic coagulants do not produce a pH effect with which the present system is designed to cope. Coagulants suitable for use in the present system include, for example, alum, sodium aluminate and ferric sulfate. Although the present system is basically designed to control coagulant dosage, the dosages of other treatment chemicals such as lime or soda ash for pH adjustment and filter aid chemicals can also be controlled using the present system by controlling the speed of the feed pumps for these chemicals with the same effluent turbidity-responsive electrical control system used to control the coagulant feed rate.

*pH adjustment of the control sample*

A calcite bed is preferably used for pH adjustment of the control stream, although treatment with soda ash or liquid sodium hydroxide would also suffice for this purpose. A minimum mixing time of approximately 2 minutes should be provided for the coagulant-treated sample before it enters the calcite bed. The calcite bed raises the pH of a coagulant-treated sample of low alkalinity into a range that will provide optimum coagulation. For most waters, optimum coagulation occurs in a pH range of from about 6 to 7. Low alkalinity in the pilot flow is undesirable because it inhibits floc formation and therefore results in the presence of uncoagulated alum or other coagulant in the sample flow which would cause a high turbidity in the filter effluent unless removed before reaching the filter. The calcite bed acts to remove the effect of any excess coagulant in the pilot flow by adjusting the alkalinity according to the following chemical reactions assuming alum is used as the coagulant:

(1) $Al_2(SO_4)_3 + 6H_2O = 2Al(OH)_3 + 3H_2SO_4$
   (alum coagulant)   (floc)   (sulfuric acid)

(2) $2CaCO_3 + H_2SO_4 = CaSO_4 + Ca(HCO_3)_2$
   (calcite)

The sulfuric acid formed when the alum is mixed with the raw water is removed by its chemical reaction with the calcite bed. Both the resultant calcium sulfate and the calcium bicarbonate formed are soluble in water and alkaline, thereby raising the pH of the sample water into the proper range for good coagulation. However, if the water sample reaching the calcite bed is initially in the proper pH range or above such range, the calcite bed will have little, if any, effect on the pH of the sample. Thus, for example, if the pH of the coagulant-treated water were 5, the calcite bed might raise its pH to approximately 6.6, but if the pH of the coagulant-treated water were 8, the pH of the water would remain at 8 as it passes from the calcite bed.

A further advantage of passing the sample through the calcite bed is that it gives additional flocculation time to promote floc growth in the pilot stream.

The calcite bed is designed on an upflow fluidized basis to prevent the filtration or accumulation therein of coagulated turbidity particles. Rates in the range of from 12 to 20 gallons per minute per square foot of area have been found to be sufficient to fluidize the bed. A columnar vessel having a three-quarter inch or one inch inside diameter of a length sufficient to give a three-minute detention time produces the desired effect. The vessel is filled with calcium carbonate in granular form. Over a period of time the calcium carbonate in the vessel will gradually be depleted and will require replacement. Replacement should be required only at infrequent intervals, however, depending on the frequency and length of the periods of high alum feed or low alkalinity of the raw water.

*The settling tube*

The primary purpose of the settling tube is to provide for relatively rapid settling of the majority of the coagulated material so as to reduce the load carried to the sampling filter. This is accomplished in the settling tube by providing a relatively shallow nonturbulent flow of material at a reduced flow rate. The relatively small depth of flow through the tube reduces appreciably the distance through which floc must fall to settle and therefore reduces considerably the detention time required to settle most of the floc from the flow as compared with conventional settling basins. The settling tube should be designed to remove from 75 to 95 percent of the coagulated material. The amount actually removed will, of course, depend upon the turbidity of the sample entering the tube. In general settling tubes of from about one-half inch to six inches in inside diameter appear to be practical for use in the present system. Of course, the smaller the inside diameter of the settling tube, the smaller will be the capacity of the tube, but the more rapid will be the settling therein.

Tests have shown that a settling tube should be used in the present dosage control system if the water treatment facilities will at times be handling raw water having a turbidity in excess of 750 p.p.m. Raw water turbidity below this level could be handled effectively without the use of settling means. Laboratory tests have shown that a dosage control system incorporating a settling tube as described is capable of handling raw water having a turbidity as high as 10,000 p.p.m.

The settling tube is disposed generally horizontally, but on a slight upslope in the downstream direction to prevent carry-over of settled matter to the pilot filter and to increase the storage capacity of the tube. The upslope also facilitates backwashing of the tube to remove settled matter therefrom at its upstream end.

The settling tube is preferably designed to provide a 3 to 4 minute minimum detention time, assuming a 250 cc. per minute flow rate through the pilot line. Of course, the longer the tube the greater will be its storage capacity and the more infrequently will backwashing be required. The minimum 3 to 4 minute detention time in the settling tube of the pilot system should be compared with the usual 2 to 4 hour detention time required to remove up to 99 percent of the coagulation load in plant scale settling basins. The inclusion of a settling tube in the present dosage control system enables the system to handle waters of high turbidity and yet permits a turbidity reading of the effluent of the sample within minutes after the sample is withdrawn from the main body of raw water. Preferably duplicate settling tubes in parallel are used in the pilot system so that one tube can be backwashed and prepared for use while the other tube is in operation.

*Pilot filter*

As with the settling tubes, a pair of identical pilot filters are preferably provided in the pilot system with one of the filters being backwashed while the other is filtering the pilot sample. The pilot filters remove the coagulated material which is not removed previously by the settling tube. It is important that the possibility of filter breakthrough in the pilot filters be minimized because such a breakthrough would cause an increase in the pilot effluent turbidity reading, resulting in an unnecessary increase in coagulant dosage. This in turn would result in an excess of coagulant in the plant flow, causing short filter runs, excessively low pH, and a turbid plant effluent.

To minimize the possibility of filter breakthrough, a filter of the multimedia type is preferred, with the effective size of the filter material decreasing in the direction of flow although the filter particles of different sizes are intermixed by backwashing the material to achieve an equilibrium distribution. A suitable filter bed of the foregoing type is described, for example, in United States patent application Serial No. 345,204, filed Feb. 17, 1964 by Archie H. Rice and Walter R. Conley and entitled "Filter and Method of Making Same." However, in using such a bed, it is desirable to add a secondary flocculant, also known as a filter aid chemical, to the pilot flow just before the pilot flow enters the pilot filter for reducing further the possibility of filter breakthrough and for prolonging the length of filter runs. Any one of the secondary flocculants, such as Separan, an acrylamide polymer hydrolyte, or other filter aids described in U.S. Patent 3,067,-133, are satisfactory for this purpose. However, it is desirable to eliminate the secondary flocculant feed to the pilot system if possible in order to simplify the dosage control system. A filter bed designed for use without secondary fluocculant is described in detail in Example B, supra. Another filter bed suitable for use with a secondary flocculant is described in Example A, infra.

It is also desirable to provide at intervals along the length of the pilot filter flow interrupters to prevent plug flow during backwash. A suitable type of flow interrupter is described in Example B below.

*Effluent turbidimeter*

The turbidimeter used to measure pilot filter effluent turbidity preferably has a sensitivity of 0.01 p.p.m. change in turbidity. Any turbidimeter having the required sensitivity would be satisfactory for this purpose, but most of those now available are of the light-scattering type, such as the one described in U.S. Patent 3,067,133.

Dosage controller

In the automatic dosage control system of U.S. Patent 3,067,133, previously referred to, the pilot filter effluent was monitored continuously in response to each fluctuation in effluent turbidity, the object being to adjust the coagulant dosage as soon as possible after the pilot sample was removed from the main body of raw water. However, in the present system it is considered more desirable to adjust the coagulant dosage in predetermined increments and only after a predetermined period of time has elapsed after a sensing of effluent turbidity outside a control range. If effluent turbidity returns to its normal acceptable range within this period, then the dosage is not adjusted. A preferred turbidity scanning and control unit for this purpose is described in Example B below.

Plant scale dosage control

Although the illustrated and described dosage control system is incorporated on a pilot scale, it also contemplated that the dosage control system could be incorporated on a plant scale if desired. It is estimated that plant scale systems would be capable of treating water at a rate in excess of one million gallons per day (1 m.g.d.). On a plant scale the entire plant flow would pass through calcite beds and a multiplicity of settling tubes before being treated with secondary flocculant and passed through the plant filters, which would preferably be of the multimedia type described in application Ser. No. 345,204. The plant filter effluent would then be monitored in the manner previously described and the coagulant dosage adjusted automatically as required.

The plant would utilize either pressure or gravity vessels for the calcite beds, settling means and filters. Chlorine, alkalinity adjustment chemicals, and secondary flocculant feeds could be controlled by the coagulant feed control. Throughput rates for the calcite bed would be based on twelve to twenty g.p.m./sq. ft. Flow rates of one and one-half to three feet per minute would be used in the multi-tube settling device. Tubes in the size range of one-half inch to six inches in inside diameter could be used. Filter rates of three to six g.p.m./sq. ft. would be practicable.

The use of a multiplicity of settling tubes in the plant scale system would have important advantages over a conventional settling basin in that the tubes would require a much shorter detention time for settling and would be far more compact and economical than the ordinary settling basin.

Example B

Test runs have proved the success and feasibility of the present dosage control system. These runs were conducted using a pilot dosage control system sized to provide a flow of approximately 250 cc. per minute therethrough. Samples of raw water having turbidities of from 750 p.p.m. to 10,000 p.p.m. were introduced into a one inch inside diameter pilot line after the raw water had been treated with alum coagulant. The alum-treated water was then introduced into the lower end of a calcite column having a 52-inch length and a one inch inside diameter. The column consisted of a 30-inch depth of granulate calcium carbonate in the size range of $-16$ to $+50$ U.S. sieve size. It was found that rates in the range of 12 to 20 gallons per minute per foot of area were sufficient to fluidize the calcite column. Coagulant-treated raw water entering the column at a pH below 6 after passing through the column was found to have a pH of approximately 6.6, which is in the proper range for optimum coagulation for most waters.

From the calcite column the sample stream was passed into a generally horizontal settling tube having a 36-inch length and a one and one-half inch inside diameter. The tube was provided with an upslope in the direction of flow of approximately one-half inch in its 36-inch length.

In laboratory tests with raw water having 10,000 p.p.m turbidity, the settling tube removed approximately 96 percent of the turbidity, but filled in 30 to 40 minutes. Filter runs of 60 minutes were obtained with raw water of this turbidity. In tests carried out with raw water of 1,000 p.p.m. turbidity, the settling tube removed approximately 80 percent of the coagulated material to give filter runs of approximately three hours. Without the settling tube, the pilot filter was unable to handle a raw water turbidity of 10,000 p.p.m. and provided filter runs of only about 60 minutes with a raw water turbidity of 1,000 p.p.m.

The velocity of flow through the settling tube was approximately 0.75 foot per minute giving a detention time of approximately four minutes at 250 cc. per minute flow rate.

Although the three-foot length of settling tube was selected to reduce the overall size of the dosage control system, a longer settling tube would provide more storage capacity.

The effluent from the settling tube was passed through a multimedia filter comprising a tube having a 50-inch length and a two inch inside diameter. The tube was provided with thirteen flow interrupters spaced equal distances apart along the length of the tube within the filter material. Each flow interrupter consisted of a pair of cross hairs, at right angles to one another, with each set positioned at 45 degrees with respect to the immediately adjacent sets of cross hairs.

Some of the tests were run without the water being treated with a secondary flocculant before it entered the filter, and satisfactory results were obtained using the following filter bed design, proceeding from top to bottom in the direction of flow, after the bed above the base layer had been backwashed to equilibrium.

| Depth | U.S. Sieve Size | Type of Media |
| --- | --- | --- |
| 5 inches | $-20+30$ | Coal. |
| 5 inches | $-30+40$ | Sand. |
| 5 inches | $-50+60$ | Alumina. |
| 6 inches | $-100+120$ | Garnet. |
| 4 inches | $-80+100$ | Do. |
| 4 inches | $-70+80$ | Do. |
| 1 inch | $-30+40$ | Do. |
| 3 inches | No. 16 | Garnet base. |

The base layer of garnet was supported on a multimetal screen at the base of the tube. Initial head loss across the foregoing "fine" bed was six inches mercury. Although this starting head loss can be considered too high for most plant designs, it presents no problem in a pilot filter operation. At a 250 cc. per minute flow rate through the pilot system, the filter rate was three gallons per minute per square foot of filter area, with the depth of the filter media being approximately 30 inches.

Having illustrated and described a preferred embodiment of the invention and having described several modifications thereof, it should be apparent to those skilled in the art that the invention permits of other modifications in arrangement and detail. We claim as our invention the described embodiment and modifications and all other modifications that come within the true spirit and scope of the following claims.

We claim:
1. In the treatment of water or sewage to be filtered, the method of controlling the dosage of coagulating chemicals added to the influent to be treated comprising:
  adding an inorganic coagulant to the raw influent,
  withdrawing a portion of said coagulant-treated influent and adjusting the alkalinity of the same so that said portion has a predetermined minimum alkalinity for promoting optimum coagulation,
  then filtering the said portion to remove coagulated material therefrom,
  then measuring the turbidity of the filtrate of said portion and adjusting the coagulant dosage of the influent by increasing said dosage upon an increase in filtrate turbidity and decreasing said dosage upon a decrease in filtrate turbidity.

2. The method according to claim 1 wherein the alkalinity of said portion of the coagulant-treated influent is adjusted by treating the same with either sodium hydroxide or sodium carbonate.

3. The method according to claim 1 including the step of settling at least a substantial proportion of the floc from said coagulant-treated influent portion after adjusting the alkalinity of said portion and before filtering said portion.

4. The method according to claim 3 including adding a secondary fluocculant to said portion after said step of settling immediately prior to filtering said portion.

5. The method according to claim 3 wherein said portion is settled by passing the same longitudinally in a shallow steam through a generally horizontal, elongated settling tube so as to settle the floc with a relatively small detention time.

6. The method according to claim 1 wherein the alkalinity of of said portion of the coagulant-treated influent is adjusted by passing the same through a bed of calcium carbonate.

7. The method according to claim 6 wherein said portion of influent is passed in a shallow stream through a generally horizontal, elongated settling tube after passing the same through said bed of calcium carbonate and before filtering the same.

8. A coagulant dosage control system for use in the treatment of water or sewage comprising:
   conduit means including a raw water inlet and defining a main flow path for raw water to be treated and a pilot flow path leading from said main flow path downstream from said raw water inlet,
   means for injecting coagulant into said main flow path upstream from said pilot flow path,
   a calcite column in said pilot flow path for adjusting the alkalinity of the pilot flow,
   a settling means in said pilot flow path downstream from said calcite column,
   a pilot filter means in said pilot flow path downstream from said settling means,
   a turbidity-sensing means in said pilot flow path downstream from said pilot filter,
   and control means operatively connected to said turbidity-sensing means for automatically varying the rate of feed of said coagulant-injecting means in response to variations in turbidity sensings.

9. A dosage control system according to claim 8 wherein said control means includes:
   means for increasing and decreasing said dosage in increments in response to turbidity sensings outside a predetermined control range,
   and time delay means for delaying incremental dosage changes for a predetermined period of time following a turbidity sensing outside said range and for enabling dosage changes only if the turbidity sensing remains outside of said range at the end of said period so as to prevent dosage changes upon only momentary changes in turbidity sensings.

10. In a process for clarifying water the steps of:
    adding an inorganic coagulant to water,
    passing water upwardly through a bed of calcite particles.
    and filtering said water to remove coagulated material therefrom.

References Cited

UNITED STATES PATENTS

| 2,661,333 | 12/1953 | Schein | 210—62 |
| 3,067,133 | 12/1962 | Conley et al. | 210—53 |
| 3,097,163 | 7/1963 | Riddick | 210—53 |
| 3,262,878 | 7/1966 | Beckley et al. | 210—53 |

FOREIGN PATENTS 746,980  3/1956  Great Britain.

OTHER REFERENCES

Symons, G. E., Coagulation, Water and Sewage works, November 1955, vol. 102, pp. 470–473 relied on.

MICHAEL E. ROGERS, *Primary Examiner.*

UNITED STATES PATENT OFFICE
CERTIFICATE OF CORRECTION

Patent No. 3,393,149

July 16, 1968

Walter R. Conley et al.

It is certified that error appears in the above identified patent and that said Letters Patent are hereby corrected as shown below:

In the heading to the printed specification, lines 5 and 6 "assignors to General Services Company," should read -- assignors Neptune Microfloc, Incorporated, --. Column 1, line 41, "promite" should read -- promote --. Column 9, line 17, "steam" should read -- stream --. Column 10, line 22, after "to" insert -- said --; line 23, after "passing" insert -- said --; same column 10, between lines 24 and 25, insert -- at a rate sufficient to fluidize said particles, --.

Signed and sealed this 23rd day of December 1969.

(SEAL)
Attest:

Edward M. Fletcher, Jr.
Attesting Officer

WILLIAM E. SCHUYLER, JR.
Commissioner of Patents